Jan. 16, 1940.   L. A. MEISSE   2,187,135
SECTION INSULATOR
Filed May 27, 1938
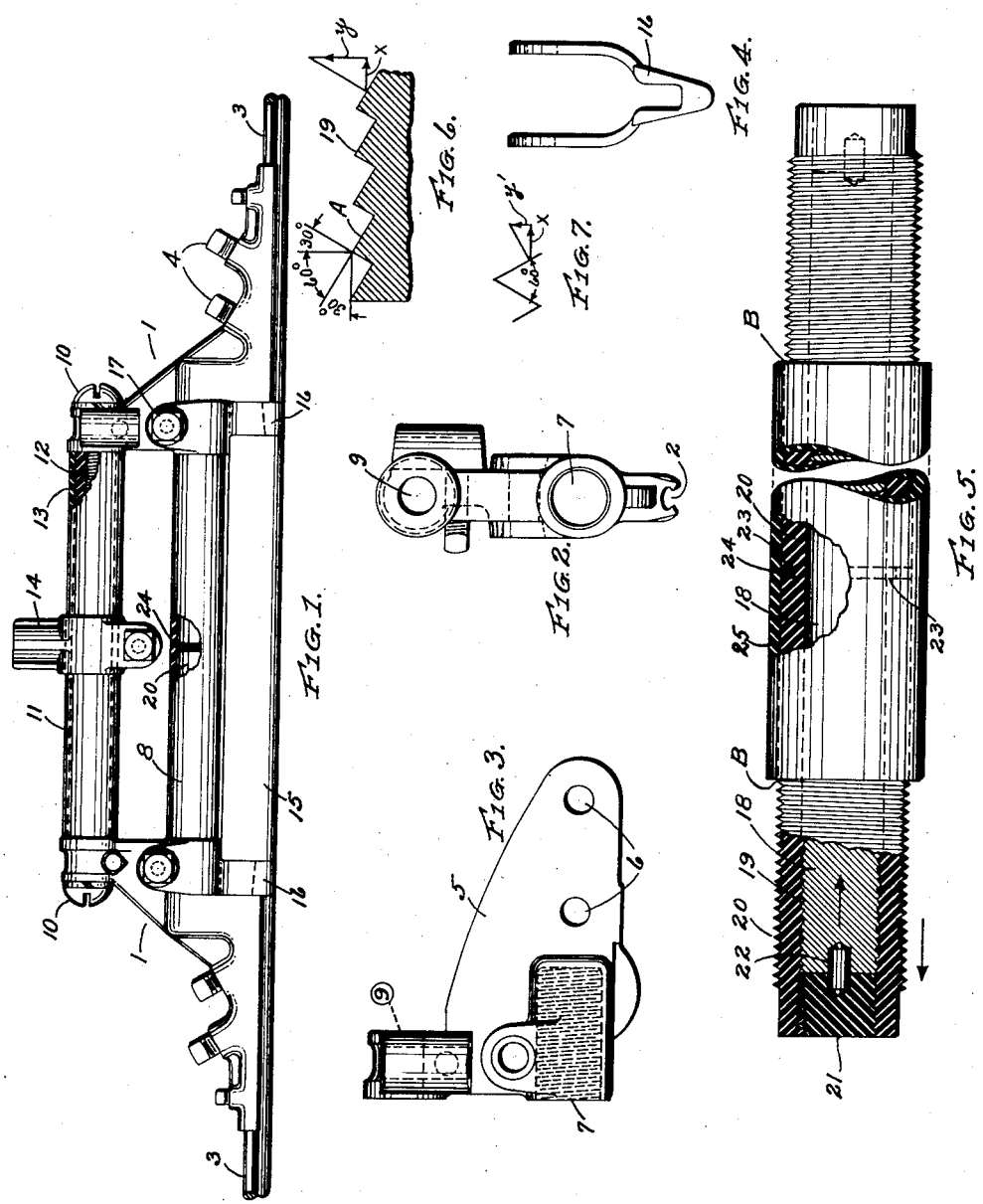
Inventor
LOUIS A. MEISSE
By
Attorney Patented Jan. 16, 1940

2,187,135

UNITED STATES PATENT OFFICE 2,187,135

SECTION INSULATOR

Louis A. Meisse, Mansfield, Ohio, assignor to The Ohio Brass Company, Mansfield, Ohio, a corporation of New Jersey Application May 27, 1938, Serial No. 210,403

10 Claims. (Cl. 191—39)

My invention relates to overhead trolley devices and in particular to those devices for supporting a trolley wire in an overhead system and is an improvement over the device disclosed in Matthes Patent 2,127,085.

One object of my invention is to provide a device for insulating and sectionalizing trolley wires.

Another object is to provide an insulator of greater strength, size for size, than the prior art provides in like devices.

Another object is to provide an insulator in which the insulating parts are less subject to burning from the arc formed by a current collector in crossing the device than present devices.

Still another object is to provide an insulator in which the insulating member which is subject to a tensile strain is provided with means to determine the point at which any over-stress in the insulation of the tension member shall be relieved.

My invention resides in the new and novel construction, combination and relation of the parts described in the specification and shown in the accompanying drawing.

In the drawing:

Fig. 1 is a side view in partial section of my invention.

Fig. 2 is an inner end view of the end castings shown in Fig. 1.

Fig. 3 is a side view of a modified form of end member.

Fig. 4 is an end view of the clip by means of which the insulating bridging member is supported.

Fig. 5 is a side view in partial section of my improved tension member used in connection with Fig. 1.

Fig. 6 is an enlarged view of the thread or interlock which I use upon the ends of the metal core of the tension member shown in Fig. 5.

Fig. 7 represents a standard U. S. thread.

In the preferred embodiment of my invention for sectionalizing a trolley wire, I make use of two end members 1 spaced apart and provided with a longitudinal groove 2 to receive a trolley wire 3. The trolley wire is held in place by means of set screws 4, the points of which bite into the trolley wire.

In Fig. 3 I show a modified form of the end member 1 in that it is provided with a projecting tongue 5 to be received in a groove on another overhead device and having openings 6 to receive through bolts for holding the parts together.

Both forms of end members are provided with a threaded socket 7 and I prefer to thread one socket right-hand and the other socket left-hand to receive the ends of the tension member 8. The sockets are threaded with standard U. S. thread but other forms of threads may be used.

The end members are provided with through openings 9 to receive the screws 10 which interlock with the compression member 11.

The compression member 11 comprises a rod or tube 12 of insulating material with internally threaded ends to receive the screws 10. The rod 12 is preferably formed of layers of fibrous material such as paper or canvas which is impregnated with a waterproof material such as copel, shellac, or one of the synthetic resins such as "Bakelite", preferably the latter which is a phenolic condensation product.

In order to prevent burning of the core 12 due to flash formed by a current collector passing across the device, I enclose the core 12 in a casing or tube 13 formed of chemically treated paper commonly known as Vulcoid or vulcanized fibre or other similar material and which is much less subject to the action of the arc than is the impregnated material referred to above and used in the core 12.

Mounted upon the compression member 11 is a supporting clamp 14 which may be attached to an overhead hanger or other support.

Positioned between the end castings at the lower side thereof is a bridging member 15 made of insulating material such as wood, fibre, rubber, etc., and which is held in position by means of the easily renewable supporting clips 16 which in turn are secured to the end members by means of bolts 17.

The lower surfaces of the trolley wires 3, the supporting clips 16, and the bridging member 15 are arranged in a common plane or alignment in order that the current collector may pass smoothly across the device from one trolley wire to the other.

The construction of the tension member 8 is of the greatest importance as it is subject to the entire strain between the trolley wires 3 multiplied by whatever length the lever arm may be.

By certain improvements in the construction of the tension member, I am able to overcome several weaknesses present in similar devices of the past and materially increase the strength of the member.

In the preferred construction of the tension member, I employ a metal rod 18, preferably of steel, which is provided with threads or annular grooves 19 extending along the side surfaces thereof for a predetermined distance from the ends thereof. This rod is then encased in an insulating covering 20.

I prefer to form the casing 20 by winding upon the prepared rod 18 sheet insulating material of paper, canvas, etc., which has been impregnated with an insulating and waterproof binding materials, preferably one of the synthetic resins such as "Bakelite", a phenolic condensation product. Sufficient pressure is used to cause the insulation to interlock with the threads or grooves on the rod.

The metal rod 18 does not extend entirely to the ends of the insulating casing 20 and, therefore, I close the ends of the casing by means of plugs 21, preferably of the same material as the casing 20.

The outer longitudinal surface at the opposite ends of the casing 20 for a predetermined distance back therefrom are threaded right-hand and left-hand respectively to cooperate with the threads in the sockets 7.

By means of the tension member 8, the end members 1 are securely held in a predetermined position and may through the medium of the right and left-hand threads have their spacing adjusted by relative rotation of the end members and the tension member.

The plug 21 while shown interlocked with the casing 20 by means of a thread is molded into position the same as the rod 18 at the time the casing 20 is applied and the pin 22 assists in centering and holding the plug 21 relative to the rod 18 during such operation.

It will be noted in Fig. 6 that the thread 19 used on the ends of the rod 18 is not standard in that one face of the thread or groove is 30 degrees to a transverse plane normal to the axis of the rod 18 and the other face is at 60 degrees to that plane, thus the face A tends to exert a strong compressive or wedging force upon the portion of the casing 20 held within the cavity 7, since the outer surface of the casing 20 is interlocked with the end casing casting.

Referring to Fig. 6 it will be evident that if a longitudinal force $x$ is applied to the rod that the force $y$ tending to compress the insulating material within the cavity 7 will be much greater than though the same force $x$ were applied to a device using a standard thread as shown by $y'$ in Fig. 7.

This increased wedging or compressive force is of great importance in increasing the reliability of the tension member 8 and the strength of the tension member over that of one in which the inner and outer threads on the casing 20 are both U. S. standards.

When standard threads are used it is found that the force exerted on the tension member may be sufficient to break the longitudinal joint between the layers of insulating material within the socket 7 since the stress in the tension member is almost all longitudinal thus destroying largely the insulating value, but by substituting the wedge type of thread shown in Fig. 6, the layers of insulating material in the ends of the casing 20 are forced more tightly together as the stress in the tension member increases and this overcomes the longitudinal breaking of the joint between the layers thereof.

Having overcome or reduced materially the separation of the layers of the casing 20 due to opposite forces acting upon the inner and outer portions of the casing 20, as shown by the arrows in Fig. 5, it was found that the combined mechanical and electrical value of the tension member could be greatly improved thus permitting a much higher mechanical stress being applied to the assembled device without its breaking down electrically if the concentration of such increased stresses at the inner end of the threads as at B causing breakage of the casing at this point could be avoided.

It was found that this localization of the stresses at B was due to the uneven elongation or stretch between the steel member 18 and the casing 20, the former having considerable stretch while the latter had practically none.

By using a rod 18 having a sufficiently high yield point, it is possible to materially reduce the liability of breakage at the point B, but this possibility, I found, could be entirely avoided by so constructing the member 8 that the point of highest concentration was shifted from the point B to the longitudinal center of the member 20.

It will be recognized that a breakage of the casing at the point B, especially if it should occur at both points B in a single device would destroy the value of the tension member as an insulator as the point B is practically flush with the inner end of the live end member 1 therefor.

I produce preferably at the mid-way point between the inner ends of the threading on the casing 20 a groove 23 which will weaken the casing mechanically below the strength at the point B. By being midway between the end members 1 and being very narrow, $\frac{1}{16}$-inch or less, the groove does not reduce the insulating value of the member 8.

The groove 23 may be produced in various ways, but having formed the casing upon the rod, I prefer to form the annular groove by cutting into the casing 20 and while I prefer to cut the groove only part way through the casing in order to prevent cutting into the metal rod 18 and thereby weakening the same, the groove may extend entirely through the casing without effecting the electrical property of the member 8.

With the construction just described, if the device when in use should be loaded above the normal working load, the material of the casing 20 will rupture at the groove 23 without rupture of the casing anywhere between the groove and the ends of the casing. This grooving permits of a difference in elongation of the materials of the rod and sleeve without endangering the mechanical and electrical properties of the tension member 8 and therefore of the assembled device as a whole.

While it is not necessary, I prefer to fill the groove 23 with an elastic waterproof compound 24 and which may consist of such materials as natural or synthetic rubber, pitch, or one of the materials in the group of polymerized iso butylene. This permits the groove 23 to widen and to return to normal width depending upon the stress upon the device and the permanent stretch (if any) of the rod 18 and at the same time maintain a closed groove 23.

As the tension member 8 is quite adjacent to the lower edge of the bridging member 15, it is strongly subject to the action of the flame from the arc formed by a passing current collector as the circuit is broken at the clips 16. The casing 20 is highly insulating and resistant to the effects of moisture, but is not resistant to the effect of the flame from an arc which acts upon the binding materials, therefore, to protect the casing 20 from such flame and the rod 18 from exposure should the casing rupture at 23, I enclose that portion of the casing between the end member 1 in a tube 25 of "vulcanized fibre" or the material known as "Vulcoid" and unattached to the members 1, therefore there is no stress in tension upon the tube 25.

The outer casings 13 and 25 may be of sheet asbestos rolled upon the inner insulating casing, the layers of asbestos being impregnated and bound together by means of sodium silicate or other suitable material.

In place of the interlock between the rod 18 and casing 20 being a plurality of wedges, it may be a single wedge surface sloping from a maximum diameter at the end of the rod to a minimum diameter at a point back from the end of the rod a predetermined distance.

With the above construction of the member 3, in which the member 18 is of .30 carbon steel and ⅝-inch diameter and the outside diameter of the casing 20 1-inch, the device will withstand tension stress of 25,000 to 30,000 pounds without rupture of the rod or the casing 20; any unremoved material of the casing 20 at the groove 23 will, however, rupture without effecting the insulating value.

There are modifications to which my invention will lend itself and which will suggest themselves to those skilled in the art, therefore, I wish to be limited only by my claims.

I claim:

1. A sectionalizing device for use in an overhead system comprising a pair of spaced end members each having a threaded socket and also means adapted for attachment to other elements forming a part of the overhead system, an elongated tension member having threaded ends seated in the sockets and cooperating with the threads in the sockets to hold the end members in fixed spaced relation, the tension member comprising an elongated metal rod having its longitudinal surface entirely enclosed by a covering of fibrous insulating material impregnated with a synthetic resin to render it waterproof, the covering interlocked directly to the rod along the surface of the rod adjacent its ends to subject the rod to a longitudinal stress due to the longitudinal stress upon the device, the said interlocking comprising a spirally formed means extending around the rod and having a face sloping at an acute angle to the longitudinal axis of the rod to effect an outward compressive force upon the covering confined within the socket greater than the longitudinal stress in the rod when the end members are under stress tending to separate them, an insulating compression member interposed between the end members and an insulating bridging member held between the end members to guide a current collector across the device.

2. A sectionalizing device for use in an overhead system comprising a pair of spaced end members each having a threaded socket and also means adapted for attachment to other elements forming a part of the overhead system, an elongated tension member having threaded ends seated in the sockets and cooperating with the threads in the sockets to hold the end members in fixed spaced relation, the tension member comprising an elongated metal rod having its longitudinal surface entirely enclosed by a covering of fibrous insulating material impregnated with a synthetic resin to render it waterproof, the covering interlocked directly to the rod along the surface of the rod adjacent its ends to subject the rod to a longitudinal stress in tension due to the longitudinal stress upon the device, the said interlock comprising a spirally formed means extending around the rod and having a face sloping at an acute angle to the longitudinal axis of the rod to effect an outward compressive force upon the covering confined within the socket greater than the longitudinal stress in the rod when the end members are under stress tending to separate them, safety means intermediate the inner ends of the threaded portion of the insulated covering to reduce the tensile strength of the covering to a value below that of the threaded portion and to definitely define the point of fracture of the covering should the stress upon the device exceed a predetermined value, an insulating compression member interposed between the end members and an insulating bridging member held between the end members to guide a current collector across the device.

3. A sectionalizing device for use in an overhead system comprising a pair of spaced end members each having a threaded socket and also means adapted for attachment to other elements forming a part of the overhead system, an elongated tension member having threaded ends seated in the sockets and cooperating with the threads in the sockets to hold the end members in fixed spaced relation, the tension member comprising an elongated metal rod having its longitudinal surface entirely enclosed by a covering of fibrous insulating material impregnated with a synthetic resin to render it waterproof, the covering interlocked directly to the rod along the surface of the rod adjacent its ends whereby the rod is subjected to a longitudinal stress due to the stress upon the device, the said interlock comprising one or more circumferential grooves with a wedge surface extending around the rod and having a face sloping at an acute angle to the longitudinal axis of the rod to effect an outward compressive force upon the covering confined within the socket when the end members are under stress tending to separate them, the said compressive force at right angles to the axis of the rod being greater than the longitudinal stress in the rod, a covering of flame resisting insulating material enclosing that portion of the tension member between the inner faces of the end members and unattached to the end members, an insulating compression member interposed between the end members and an insulating bridging member held between the end members to guide a current collector across the device and safety means associated with the first said covering to reduce the strength thereof below that of the grooved portion and to definitely define a predetermined point of breakage of the covering in case the threaded portion thereof is overstressed.

4. A sectionalizing device for use in an overhead system comprising a pair of spaced end members held in spaced relation by an elongated member subject to compression and an elongated member subject to tension, when the device is in service, each end member having a threaded socket and means to secure the device in position in the system, the compression member formed of superimposed layers of fibre material impregnated with a synthetic resin and having an outer covering of chemically treated fibrous material to protect the compression member from a flaming arc of a passing current collector, the tension member comprising an elongated metal rod having its longitudinal surface enclosed in an insulating covering of superimposed layers of fibrous material impregnated with a synthetic resin, means at the ends of the rod along its longitudinal surface to interlock the casing to the rod, the said means comprising one or more circumferential wedge surfaces sloping at an acute angle to the longitudinal axis of the rod to effect a greater outward pressure upon the casing than the tension in the rod when the tension member is under longitudinal stress, threading along the outer longitudinal surface of the casing at the ends thereof to interlock with the threading of the sockets to hold the end members against separation and fixed to the casing, an outer covering of chemically treated fibrous material upon the tension casing to protect the casing from the heat of the arc of a passing current collector and insulating means to guide the current collector across the device.

5. A sectionalizing device for use in an overhead system comprising a metal rod, an insulating casing of fibrous material impregnated with a waterproof binder covering the longitudinal surface of the rod, means at the ends of the rod and casing along the adjacent longitudinal surfaces thereof to interlock the casing directly to the rod, the interlocking means between the rod and casing comprising a circumferential groove having a wedge surface sloping at such angle to the longitudinal axis of the rod and casing as to effect a greater outward compressive pressure upon the inner wall of the casing when the device is in service than the longitudinal force in the rod due to the stress upon the device, the outer longitudinal surface of the casing at the ends thereof being threaded, spaced members each provided with threaded means cooperating with a threaded end of the casing to hold the members in spaced relation, endwise projecting means on each end member to secure the device in position as an element in the overhead system, safety means associated with the insulating casing to rupture the casing should the tension in the casing exceed a predetermined value, auxiliary insulating means disposed between and unattached to the end members to protect the casing and the safety means in case of rupture, from exposure, insulating means to guide a current collector from one member to the other.

6. A sectionalizing device for use in an overhead system comprising a metal rod, an insulating casing of fibrous material impregnated with a waterproof binder covering the longitudinal surface of the rod, means at the ends of the rod and casing along the adjacent longitudinal surfaces thereof to interlock the casing to the rod, the outer longitudinal surface of the casing at the ends thereof being threaded, spaced members, each provided with threaded means cooperating with a threaded end of the casing to hold the members in spaced relation, endwise projecting means on each end member to secure the device in position as an element in the overhead system, auxiliary insulating means disposed between the end members to assist in holding the end members in spaced relation, insulating means to guide a current collector from one member to the other member, the casing having a groove formed therein intermediate the inner faces of the end members, to reduce the tensile strength of the casing to a value below the strength of the casing elsewhere along its length and to definitely locate the point at which rupture of the casing will take place without destroying the tension member as an insulator.

7. A tension member for a section insulator comprising in combination an elongated tube of insulating material having closed ends of insulating material, a central core of metal extending throughout the interior of the tube to the closing point of the tube at its ends, the core having means at each end along its longitudinal surface interlocked directly with like means on the adjacent inner surface of the tube, the said means on the casing and core comprising one or more circumferential grooves having cooperating wedging surfaces sloping at such angle to the longitudinal axis of the tension member as to exert a greater outward pressure upon the casing when stress is applied to the ends of the casing in opposite directions than the longitudinal force in the core and means on the casing at each end thereof to secure the tension member to parts of the section insulator to hold the parts in a fixed spaced relation.

8. A tension member for a trolley wire device comprising a metal rod provided with a wedging surface at each end, an insulating casing formed of superimposed layers of insulating material impregnated with a synthetic resin and covering the entire longitudinal surface of the rod, means at the ends of the casing to cooperate with means on parts of the trolley wire device to interlock with and hold the parts in spaced relation and means intermediate the ends of the casing to reduce the tensile strength of the casing below that at any other point along the casing to permit the casing to rupture and to definitely fix the point of rupture of the casing without destroying the tension member as an insulator when the rod under stress stretches more than the casing and means extending along and enclosing the insulating casing and free from interlock with aforesaid parts to protect the rod from exposure should the casing rupture.

9. A tension member for a trolley wire device subject to stress comprising a metal rod and an insulating casing closed at its ends enclosing the rod, means at the ends of the casing to secure the member to parts of the device to hold the parts in spaced relation, means for interlocking the rod to the casing, means associated with the casing to reduce the tensile strength of the casing at that point to a value below that at any other point to definitely fix the point of rupture where it will not destroy the casing as an insulator.

10. A tension member for a section insulator comprising in combination an elongated tube of superimposed layers of insulating material and having closed ends of insulating material, a central core of metal extending throughout the interior of the tube to the closing point of the tube at its ends, the core having means at each end along its longitudinal surface interlocked with like means on the adjacent inner surface of the tube, the said means on the casing and core comprising one or more circumferential grooves having cooperating surfaces whereby a greater outward pressure normal to the axis of the core is exerted upon the casing when stress is applied to the ends of the casing in opposite directions than is the longitudinal force in the core and means on the casing at each end thereof to secure the tension member to parts of the section insulator to hold the parts in a fixed spaced relation.

LOUIS A. MEISSE.